US008068515B2

(12) United States Patent
May, Jr.

(10) Patent No.: US 8,068,515 B2
(45) Date of Patent: Nov. 29, 2011

(54) FASTER MULTIMEDIA SYNCHRONIZATION OF BROADCAST STREAMS USING ROUTER CACHING OF RTCP PACKETS

(75) Inventor: William B. May, Jr., Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 879 days.

(21) Appl. No.: 11/165,479

(22) Filed: Jun. 22, 2005

(65) Prior Publication Data

US 2006/0291466 A1 Dec. 28, 2006

(51) Int. Cl.
*H04J 3/06* (2006.01)
*H04L 12/54* (2006.01)
(52) U.S. Cl. .......................... 370/503; 370/428; 370/429
(58) Field of Classification Search .................. 370/230, 370/235, 236, 377, 378, 389, 381–385, 390, 370/401, 395.2, 395.21, 395.3, 471, 475, 370/486, 493–496, 428–429, 503; 709/203, 709/220, 222, 231, 232
See application file for complete search history.

(56) References Cited

U.S. PATENT DOCUMENTS

| 6,182,135 | B1 * | 1/2001 | Ruane et al. ................... 709/224 |
| 6,263,371 | B1 * | 7/2001 | Geagan et al. ................. 709/231 |
| 7,031,311 | B2 * | 4/2006 | MeLampy et al. ............. 370/392 |
| 7,073,191 | B2 * | 7/2006 | Srikantan et al. ................ 725/87 |
| 7,412,531 | B1 * | 8/2008 | Lango et al. ................... 709/231 |
| 2004/0228367 | A1 * | 11/2004 | Mosig ............................ 370/503 |
| 2005/0076099 | A1 * | 4/2005 | Wang et al. .................... 709/219 |
| 2005/0091190 | A1 * | 4/2005 | Klemets ............................ 707/1 |
| 2006/0062208 | A1 * | 3/2006 | Li et al. .......................... 370/352 |

OTHER PUBLICATIONS

Chirstin, Nicholas, Multicasting of Real-Time Data RTP RTCP RTSP (Lecture Slides), Nov. 9, 1999, University of Viginia (Department of Computer Science).*
"RFC 1889—RTP: A Transport Protocol for Real-Time Applications" [online], Jan. 1996, Lawrence Berkeley National Laboratory, 54 pages [retrieved on Mar. 24, 2005]. Retrieved from the Internet: <URL: http://www.faqs.org/rfcs/rfc1889.html>.

* cited by examiner

*Primary Examiner* — Aung S Moe
*Assistant Examiner* — Redentor Pasia
(74) *Attorney, Agent, or Firm* — Patterson & Sheridan, LLP

(57) ABSTRACT

Synchronization of a multimedia broadcast can be achieved by enabling network devices to re-send saved RTCP packets upon a client's join request.

16 Claims, 5 Drawing Sheets

FASTER MULTIMEDIA SYNCHRONIZATION OF BROADCAST STREAMS USING ROUTER CACHING OF RTCP PACKETS

BACKGROUND OF THE INVENTION

Real-time transport protocol (RTP) provides end-to-end delivery services for data with real-time characteristics, such as interactive audio and video. The protocol is generally used to broadcast multimedia content through networks. RTP transfers data via RTP streams, and different types of data are generally transferred in separate streams. In a multimedia broadcast, recipients generally need to synchronize different media data from different streams.

Although an RTP packet includes in its header a sequence numbering and RTP timestamping information, this information alone is insufficient to synchronize data received from different streams. This is because generally each stream assigns random values to its initial timestamp and initial sequence number, and the timestamp's clock frequency is dependent on the format of data carried.

Some applications use the arrival time of the RTP packets to synchronize between streams. The problem with this approach is that RTP does not guarantee packet delivery, nor does it prevent out-of-order delivery. As a result, synchronization based on the arrival time cannot guarantee accuracy.

The most accurate method of synchronization requires waiting for a Real-time Transport Control Protocol (RTCP) sender report, which contains information enabling conversion between an RTP timestamp and a common timestamp among streams in the Network Time Protocol (NTP) timestamp format. These RTCP sender reports are usually sent every 5 seconds for each stream. The conversion information contained in the RTCP sender report and a timestamp in a RTP packet can be used to calculate a timestamp that can be used for synchronization of the streams. Because the recipient needs an RTCP sender report from every stream of the broadcast, such synchronization can take as long as 5 seconds when the recipient joins the broadcast. This time lag does not take into consideration the possibility of an RTCP packet loss, in which case such synchronization takes even longer time. This time lag is not acceptable in a broadcast television scenario.

Accordingly, what is needed is a method that enables fast and accurate synchronization of a newly received broadcast across different multicast streams that make up the broadcast.

DETAILED DESCRIPTION OF PREFERRED EMBODIMENTS

The present invention is directed to a method and system to enable a recipient to synchronize multicast streams fast and accurately during a multimedia broadcast. In the method, a network device saves in its memory RTCP packets from all multicast streams that the network device receives. When a client requests to join one of such multicasts, the network device will re-send the saved RTCP packet to the client. Because the re-sent RTCP packet contains time conversion information, the client can synchronize the media content transferred in the multicast stream with other media contents of the multimedia broadcast. The network device can be a router, a switch, or other devices with equivalent functionalities known to persons of ordinary skill in the art. In the figures and following description, a router is used to represent the network device to illustrate the present invention, but the network devices are not limited to be just routers.

The invention will now be further described with reference to FIGS. 1-5.

Figure 1:
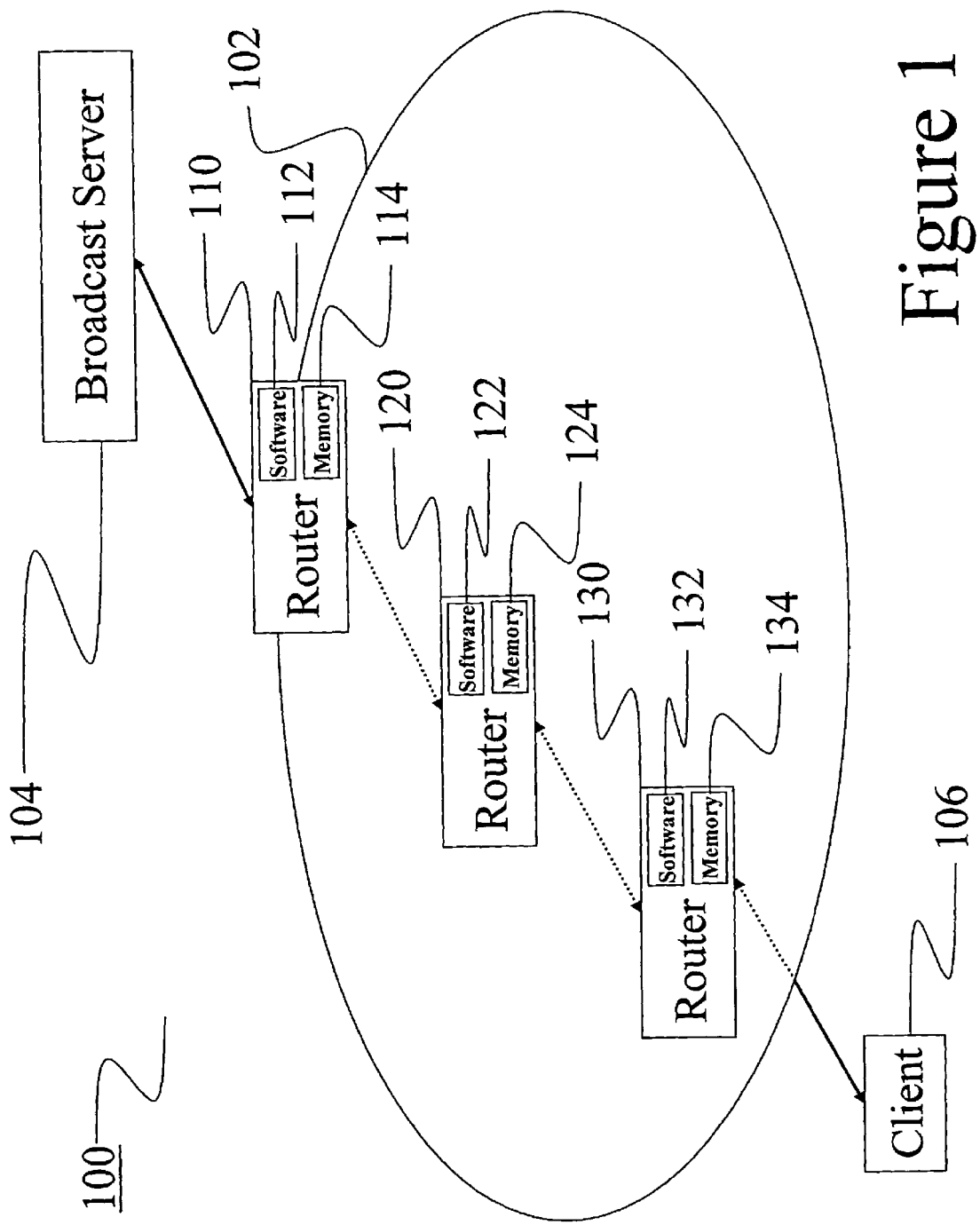
FIG. 1 is a simplified block diagram of a communication system for broadcasting multimedia content according to one embodiment of the present invention.

FIG. 1 is a simplified block diagram of an example communication system 100 for broadcasting multimedia content in a network environment. Communication system 100 includes a broadcast server 104, a client 106, and a network 102 having multiple routers 110, 120, and 130. Only one broadcast server 104, one client 106, and three routers 110, 120, and 130 are shown for clarity. In general, any number of these components can be included in the system of the present invention.

The broadcast server 104 and client 106 are connected via network 102. The network 102 connects all the components of the present invention, and can be any type of computer network or combination of networks. In one example, the network 102 includes the Internet.

The broadcast server 104 is connected to the network 102 via the router 110. There could be a plurality of routers between the router 110 and the client 106. Referring to FIG. 1, the router 110 and the client 106 are connected via routers 120, 130.

Router 110 includes software 112 and a computer readable medium such as memory-114. The software 112 can perform the following tasks: (1) detecting whether a received RTCP packet includes a sender report, (2) saving an RTCP packet in the memory 114, (3) detecting a multicast join request from a client, (4) searching in the memory 114 for RTCP packets from the requested multicast, and (5) re-sending RTCP packets saved in the memory 114 to the client. Routers 120 and 130 include software 122, 132, and a computer readable medium such as memory 124, 134.

Figure 2:
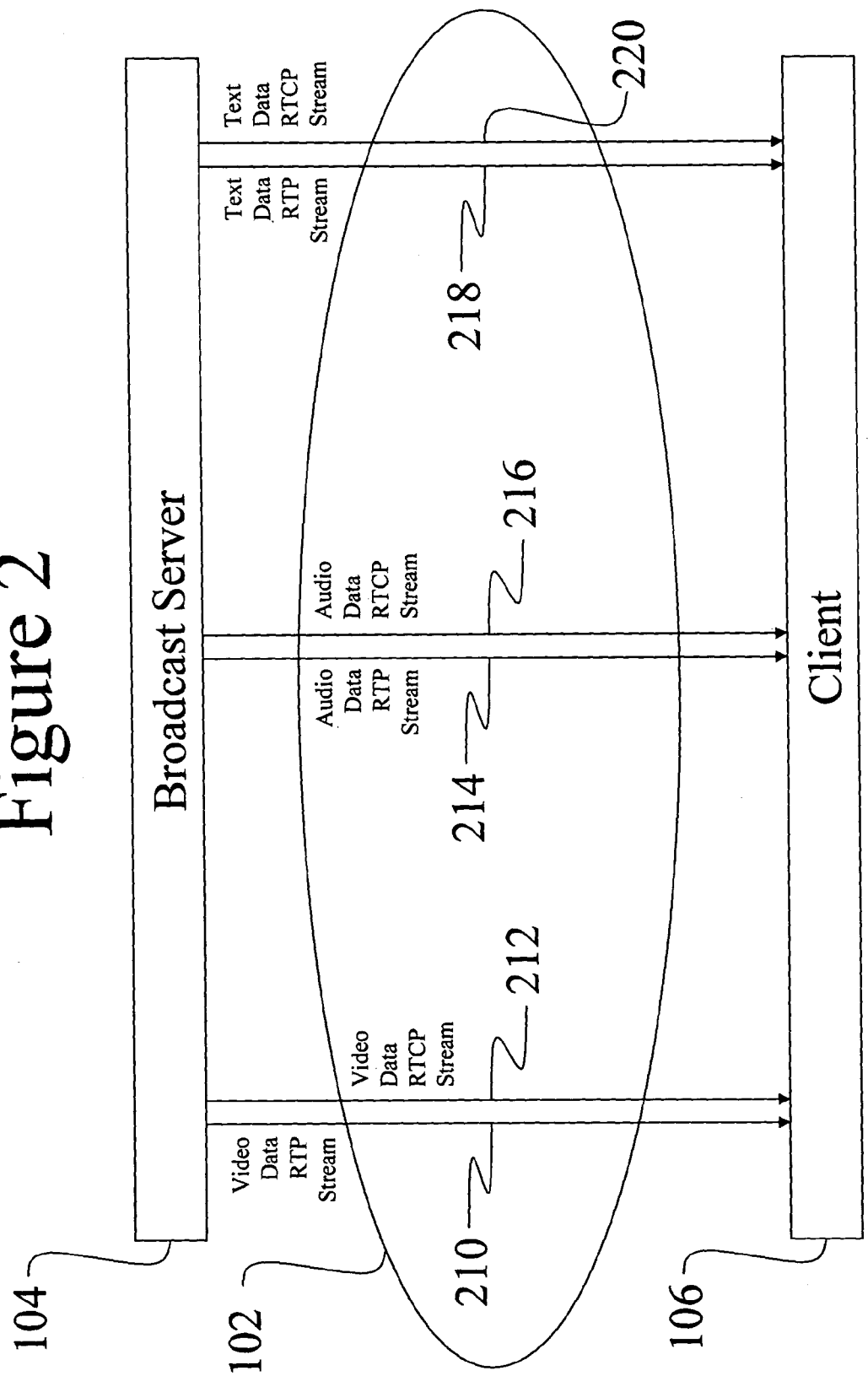
FIG. 2 is a simplified diagram illustrating RTP and RTCP streams between a broadcast server and a client during an example multimedia broadcast.

FIG. 2 is a diagram illustrating RTP and RTCP streams between the broadcast server 104 and the client 106 during a multimedia broadcast. During a multimedia broadcast, the broadcast server 104 transmits each type of media content through a separate multicast stream. For each multicast stream, the broadcast server 104 establishes a pair of RTP and RTCP streams with the client 106. The example multimedia broadcast shown in FIG. 2 includes video, audio, and text content. For the video content, the broadcast server 104 establishes a video data RTP stream 210 and its corresponding video data RTCP stream 212 with the client 106. Likewise, the broadcast server 104 also creates RTP-RTCP stream pairs to transmit audio, 214 and 216, and text content, 218 and 220, to the client 106.

The broadcast server 104 encapsulates media data into RTP packets and sends them through an RTP stream established for such media, and related RTCP packets through the corresponding RTCP stream. For example, the broadcast server 104 submits the video data through the RTP stream 210, and related RTCP packets through the RTCP stream 212.

Figure 3:
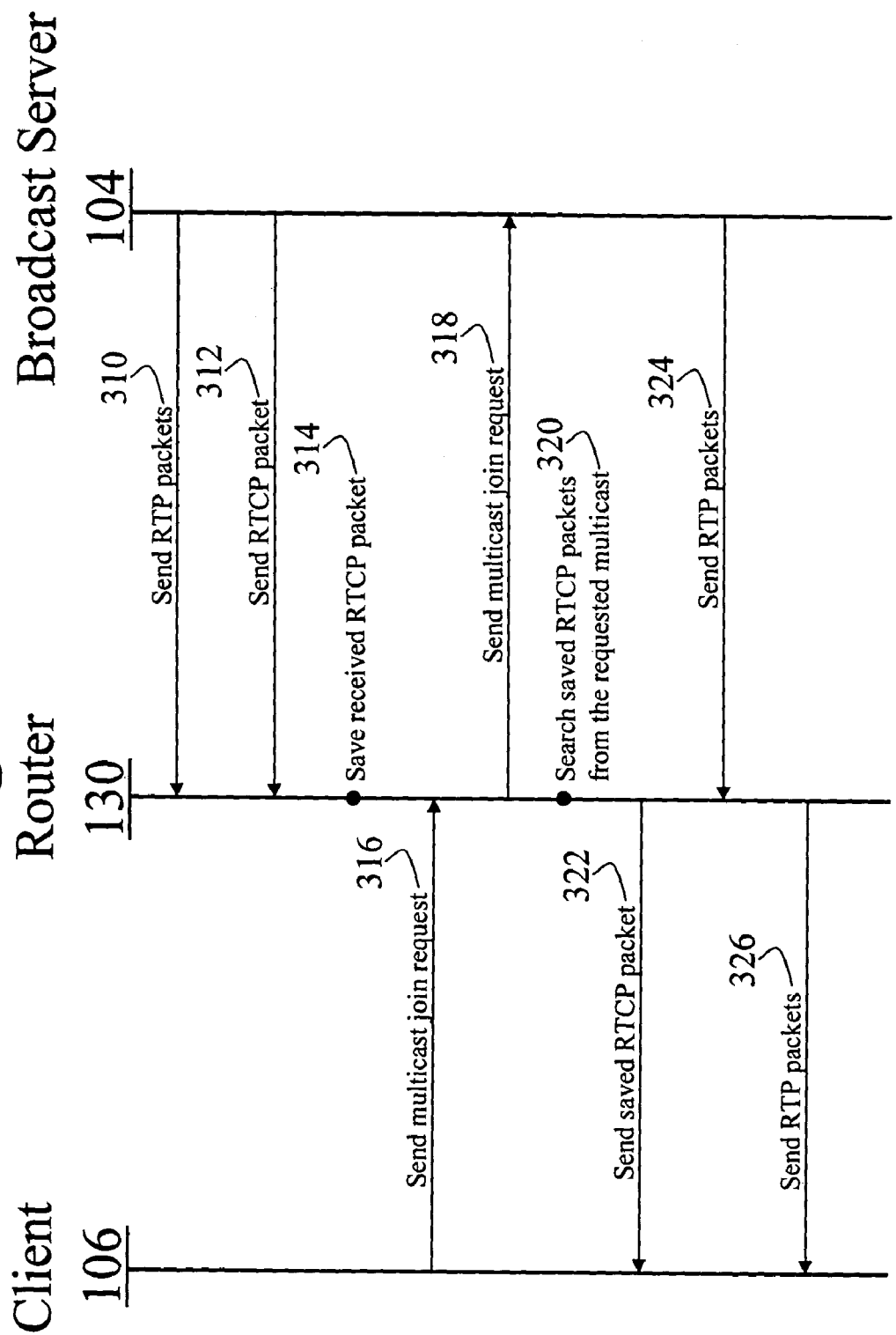
FIG. 3 is a diagram that describes a routine for a router to handle a client's request to join a multimedia broadcast according to an embodiment of the present invention.

FIG. 3 is a diagram illustrating a method associated with the router 130 handling the client's request to join a multicast.

In an embodiment, the actions of router 130 are performed by software 132. Other embodiments may use hardware, firmware, or a combination to perform actions in the router 130. The flowchart begins at step 310, when the broadcast server 104 sends multimedia contents encapsulated in RTP packets through the router 130 to an existing multicast group. The broadcast server 104 sends a corresponding RTCP packet through the router 130 at step 312.

As shown in FIG. 1 above, the router 130 includes software 132 and memory 134. The software 132 at step 314 detects whether the received RTCP packet includes a sender report. If the RTCP packet does include a sender report, then the software will save the RTCP packet in the memory 134.

When client 106 decides to join the multimedia broadcast, it sends a multicast join request for each multicast stream that forms the broadcast. As shown in FIG. 3, client 106 sends a multicast join request at step 316. The router 130 routes the request to the broadcast server 104 at step 318. The software 132, after recognizing that the client 106 sent a multicast join request, searches in memory 134 for saved RTCP packet from the requested multicast stream at step 320. If the software 132 found a matching RTCP packet, then the software 132 will re-send the RTCP packet to the client 106 at step 322.

In one embodiment, the software 132 searches in the memory 134 for saved RTCP packets with the same multicast address as in the join request. Because different multicast streams in a multicast session may share the same multicast address, the software 132 may find multiple saved RTCP packets with matching multicast address. The software 132 re-sends all matching RTCP packets saved in the memory 134 to the client 106. The client 106 can detect the re-sent RTCP packet from the multicast stream it requested to join from the other re-sent RTCP packets sharing the same multicast address in a manner known to persons of ordinary skill in the art. In a preferred embodiment, the broadcast server 104 assigns each multicast stream a different multicast address. In this preferred embodiment, the software 132 only needs to send one saved RTCP packet with matching multicast address.

After the broadcast server 104 receives the multicast join request, it adds the client 106 to the multicast group in a manner known to persons of ordinary skill in the art. RTP packets arrive at the router 130 at step 324. The router 130 routes the RTP packets to the client at step 326. After receiving RTP packets from all multicast streams of the multimedia broadcast, the client can synchronize media contents cross all multicasts with the RTCP packets re-sent by the router 130. Thus, client 106 does not have to wait for broadcast server 104 to send an RTCP packet.

Figure 4:
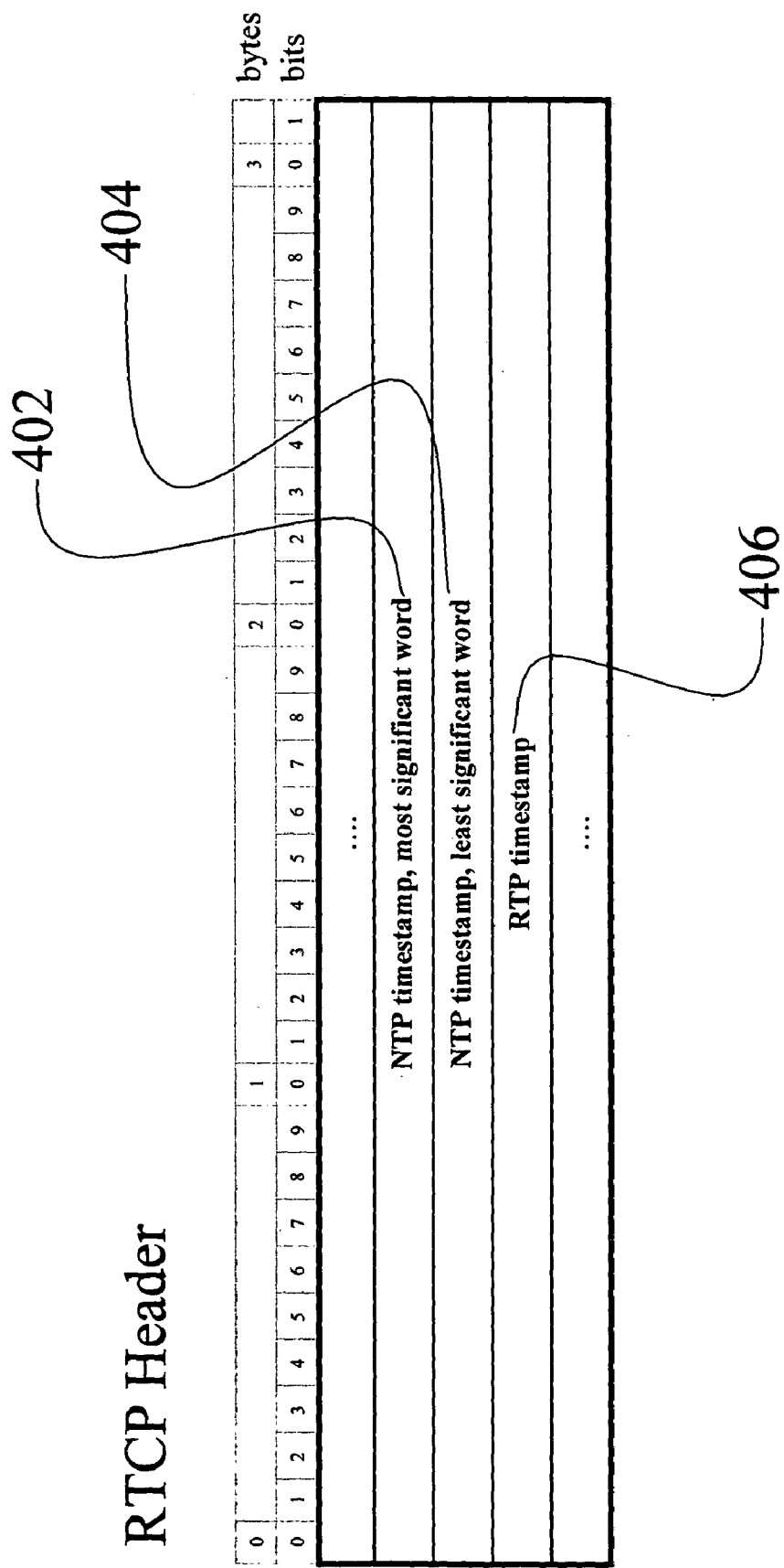
FIG. 4 is a diagram showing a partial format of an RTCP header.
Figure 5:
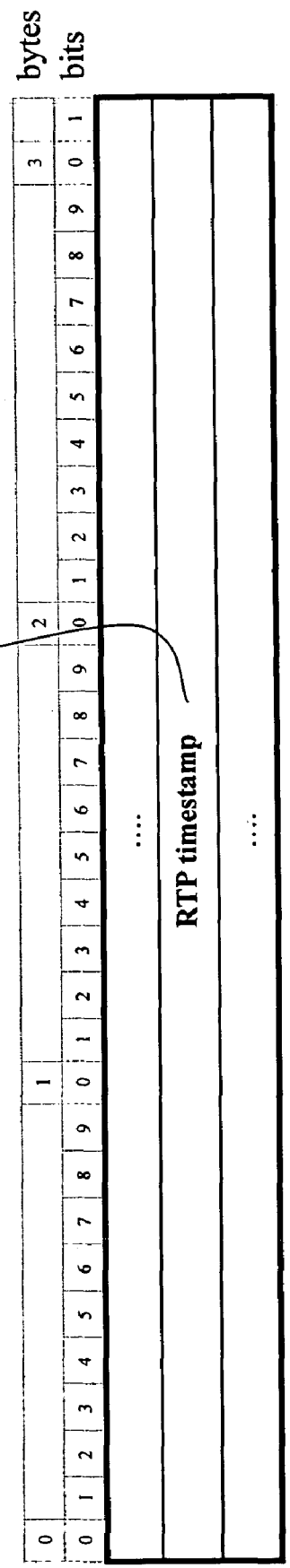
FIG. 5 is a diagram showing a partial format of an RTP header.

FIGS. 4-5 show diagrams of an RTCP header and an RTP header, respectively. An RTCP header includes RTP timestamp 406 and corresponding common timestamp among streams in the NTP timestamp format 402, 404. An RTP header includes RTP timestamp 502.

When the client 106 receives an RTP packet, it can match the RTP packet with the earlier received RTCP packet re-sent by the router 130 from corresponding RTCP stream. In one embodiment, the client 106 matches the RTP packet with the RTCP packet by their multicast addresses and ports. The multicast address of an RTP packet or an RTCP packet is the packet's IP destination address. The client 106 can extract the IP destination addresses and ports from the RTP packet and the RTCP packet in a manner known to persons of ordinary skill in the art. Because the broadcast server 104 assigns the same multicast address and a pair of ports to a pair of RTP and RTCP streams, the client 106 can identify the corresponding RTCP packet by matching the RTP packet's multicast address and port with the RTCP packet's.

The re-sent RTCP sender report contains an RTP timestamp 406 and a corresponding common timestamp among streams in the NTP timestamp format 402, 404. Values 406, 402, and 404 allow a conversion value to be determined in a manner known to persons of ordinary skill in the art. With this RTP-NTP timestamp conversion value and RTP timestamp's clock frequency, the client 106 can calculate the received RTP packet's corresponding timestamp among streams in the NTP timestamp format. In a preferred embodiment, the common timestamp among streams in the NTP timestamp format 402, 404 is the actual NTP timestamp.

Because the calculated timestamp in the NTP timestamp format is consistent across all streams, the client 106 can use it to synchronize all streams.

By re-sending the saved RTCP packet, the router 130 greatly enhances the client 106's synchronization performance. Because the broadcast server 104 sends out RTCP packets every 5 seconds, by not waiting for the latest RTCP, the client 106 can achieve synchronization up to 5 seconds earlier. Also, the risk of losing the re-sent RTCP packet is lower than such risk of the RTCP packet sent from the broadcast server 104, because the router 130 is closer to the client 106 than the broadcast server 104. Such reduced risk will enable the client 106 to achieve synchronization even faster.

In a preferred embodiment where the broadcast server 104 assigns each multicast stream a different multicast address, a router only saves the most recently received RTCP packet of a multicast stream, and discards previously saved RTCP packet from the same multicast stream. In another preferred embodiment, a router discards previously saved RTCP packets the router received more than 5 seconds before.

In a preferred embodiment, the router 130 routes the client 106's multicast join request to the broadcast server 104 before the software 132 searches in memory 134 for cached RTCP packet from the requested multicast stream. In other embodiments, the router 130 searches for matching RTCP packet before routing the request to the broadcast server 104, or performs the two actions simultaneously.

In a preferred embodiment, all routers save RTCP packets when they receive them. In other embodiments, only the routers closest to the broadcast server 104 save RTCP packets sent by the broadcast server 104.

In a preferred embodiment, only the router closest to the client re-sends the saved matching RTCP packet to the client 106. In another embodiment, only the router closest to the broadcast server 104 re-sends the saved matching RTCP packet to the client 106. In other embodiments, some or all routers with matching RTCP packet re-send the saved RTCP packet to the client 106.

In summary, synchronization of a multimedia broadcast can be achieved by enabling network devices to re-send saved RTCP packets upon a client's join request.

While the present invention has been described with reference to certain preferred embodiments, those skilled in the art will recognize that various modifications may be provided. Variations upon and modifications to a preferred embodiments are provided for by the present invention, which is limited only by the following claims.

What is claimed is:
1. A computer-implemented method, comprising:
   receiving, by a computing device having a processor and a memory, from a server, an RTCP packet that contains timestamp conversion information for a broadcast which comprises at least two related real-time media streams, wherein the timestamp conversion information includes an RTP timestamp and a corresponding common timestamp used to synchronize media content transferred in the at least two real-time media streams of the broadcast;

storing the RTCP packet in the memory of the computing device;

receiving a multicast join request addressed to the server, wherein the multicast join request is sent by a client for the broadcast containing the at least two real-time media streams; and sending, by operation of the processor on the computing device, the stored RTCP packet stored in the memory of the computing device for the at least two real-time media streams to the client, based on receiving the multicast join request, wherein the client is configured to synchronize the media content transferred in the at least two real-time media streams of the broadcast using the timestamp conversion information of the stored RTCP packet.

2. The method of claim 1, wherein storing comprises:
replacing, in the memory storage device, a previously stored RTCP packet with the received RTCP packet.

3. The method of claim 1, further comprising:
determining whether a recipient sending the multicast join request is directly connected to the client; and
sending the stored RTCP packet for the at least-two real time media streams to the client only if the client is directly connected to the recipient.

4. The method of claim 1, further comprising:
determining whether a recipient sending the multicast join request is directly connected to the server sending the RTCP packet; and
sending the stored RTCP packet for the at least two real time media streams to the client only if the server is directly connected to the recipient.

5. The method of claim 1, where the method is performed by a router.

6. The method of claim 1, where the method is performed by a switch.

7. A system, comprising:
a routing device comprising at least a processor and a memory, wherein the memory stores instructions capable of causing the system to perform a method comprising:
receiving, from a server, an RTCP packet that contains timestamp conversion information for a broadcast which comprises at least two related real-time media streams, wherein the timestamp conversion information includes an RTP timestamp for the stream and a corresponding common timestamp used to synchronize media content transferred the at least two real-time media streams of the broadcast;
storing the RTCP packet in the memory;
receiving a multicast join request addressed to the server, wherein the multicast join request is sent by a client for the broadcast; and
sending the RTCP packet stored in the memory for the at least two real-time media streams to the client, wherein the client is configured to synchronize the at least two real-time media streams of the broadcast using the timestamp conversion information of the RTCP packet.

8. The system of claim 7, wherein the method of storing comprises:
replacing in the memory a previously stored RTCP packet with the received RTCP packet.

9. The system of claim 7,
wherein the method further comprises:
determining whether a recipient sending the multicast join request is directly connected to the client; and
sending the stored RTCP packet for the at least-two real time media streams to the client only if the client is directly connected to the recipient.

10. The system of claim 7,
wherein the method further comprises:
determining whether a recipient sending the multicast join request is directly connected to the server sending the RTCP packet received by the device; and
sending the stored RTCP packet for the at least-two real time media streams to the client only if the server is directly connected to the recipient.

11. A device comprising a network interface, one or more processors, and a non-transitory computer readable storage medium, wherein the non-transitory computer readable storage medium has instructions thereon capable of causing a data processing system to perform a method comprising:
receiving, from a server connected to the network interface, an RTCP packet that contains timestamp conversion information for a broadcast which comprises at least two related real-time media streams, wherein the timestamp conversion information includes an RTP timestamp for the stream and a corresponding common timestamp used to synchronize media content transferred in among at least two real-time media streams of a broadcast;
storing the RTCP packet in a memory;
receiving a multicast join request addressed to the server, wherein the multicast join request is sent by a client for the broadcast containing the at least two real-time media streams; and
sending the RTCP packet stored in the memory for the at least two real-time media streams to the client, wherein the client is configured to synchronize the at least two real-time media streams of the broadcast using the timestamp conversion information of the stored RTCP packet.

12. The device of claim 11, wherein storing comprises:
replacing in the memory a previously stored RTCP packet with the received RTCP packet.

13. The device of claim 11, wherein the method further comprises:
determining whether a recipient sending the multicast join request is directly connected to the client; and
sending the stored RTCP packet for the at least-two real time media streams to the client only if the client is directly connected to the recipient.

14. The device of claim 11, wherein the method further comprises:
determining whether a recipient sending the multicast join request is directly connected to the server sending the RTCP packet received by the device; and
sending the stored RTCP packet for the at least-two real time media streams to the client only if the server is directly connected to the recipient.

15. The device of claim 11, wherein the device is a router.

16. The device of claim 11, wherein the device is a switch.

* * * * *

UNITED STATES PATENT AND TRADEMARK OFFICE
CERTIFICATE OF CORRECTION

PATENT NO. : 8,068,515 B2  
APPLICATION NO. : 11/165479  
DATED : November 29, 2011  
INVENTOR(S) : May, Jr.

Page 1 of 1

It is certified that error appears in the above-identified patent and that said Letters Patent is hereby corrected as shown below:

In the Claims:

Column 5, Claim 7, Line 51, please delete "the" and insert --in-- therefor;

Column 6, Claim 11, Line 30, please delete "among".

Signed and Sealed this
Twenty-eighth Day of February, 2012

David J. Kappos
*Director of the United States Patent and Trademark Office*